United States Patent
Cladiere et al.

(10) Patent No.: US 10,544,823 B2
(45) Date of Patent: Jan. 28, 2020

(54) ADJUSTABLE-LENGTH CONNECTING ROD FOR TURBOMACHINE

(71) Applicant: SAFRAN HELICOPTER ENGINES, Bordes (FR)

(72) Inventors: Mathieu Cladiere, Moissy Carmayel (FR); Stéphane Vergez, Moissy Carmayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 16/311,653

(22) PCT Filed: Jun. 16, 2017

(86) PCT No.: PCT/FR2017/051564
§ 371 (c)(1),
(2) Date: Dec. 19, 2018

(87) PCT Pub. No.: WO2017/220891
PCT Pub. Date: Dec. 28, 2017

(65) Prior Publication Data
US 2019/0203760 A1    Jul. 4, 2019

(30) Foreign Application Priority Data
Jun. 21, 2016 (FR) ...................... 1655788

(51) Int. Cl.
*F16C 7/06* (2006.01)
(52) U.S. Cl.
CPC ............ *F16C 7/06* (2013.01); *F16C 2326/43* (2013.01); *F16C 2360/24* (2013.01)

(58) Field of Classification Search
CPC ..... F16C 7/06; F16C 2326/43; F16C 2360/24
See application file for complete search history.

(56) References Cited

U.S. PATENT DOCUMENTS 3,139,760 A * 7/1964 Pfeifer ...................... F16C 7/06
74/44
3,866,650 A * 2/1975 Larkin .................... B64C 27/54
411/285

(Continued)

FOREIGN PATENT DOCUMENTS

EP     2 499 383 A1    9/2012

OTHER PUBLICATIONS

International Search Report dated Oct. 11, 2017, issued in corresponding International Application No. PCT/FR2017/051564, filed Jun. 16, 2017, 4 pages.

(Continued)

*Primary Examiner* — Valentina Xavier
(74) *Attorney, Agent, or Firm* — Christensen O'Connor Johnson Kindness PLLC

(57) ABSTRACT

Adjustable-length connecting rod for an aircraft turbomachine, connecting rod having a generally elongate shape and having first and second longitudinal opposite ends for attachment to elements to be connected. The first longitudinal end is connected to a first threaded shaft screwed into a first tubular portion of an adjustment sleeve. The second longitudinal end is connected to a second threaded shaft screwed into a second tubular portion of the adjustment sleeve. The connecting rod further includes a housing in which at least a portion of the first shaft is configured to slide.

12 Claims, 3 Drawing Sheets

(56) References Cited

U.S. PATENT DOCUMENTS

| | | | |
|---|---|---|---|
| 5,431,540 A | 7/1995 | Doolin et al. | |
| 7,788,993 B2* | 9/2010 | Wood | B64C 1/06 |
| | | | 280/93.51 |
| 2011/0154941 A1* | 6/2011 | Gibbs | B60T 7/06 |
| | | | 74/503 |
| 2015/0292561 A1* | 10/2015 | McNeil | F16C 39/02 |
| | | | 244/213 |
| 2016/0238069 A1* | 8/2016 | Bohm | F16C 23/045 |

OTHER PUBLICATIONS

Written Opinion of the International Searching Authority dated Oct. 11, 2017, issued in corresponding International Application No. PCT/FR2017/051564, filed Jun. 16, 2017, 5 pages.

* cited by examiner

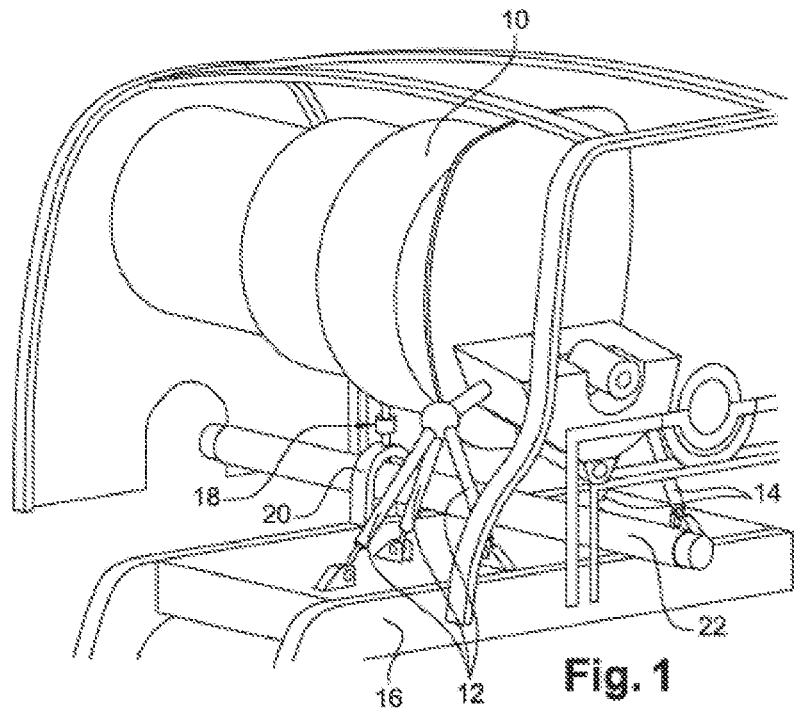
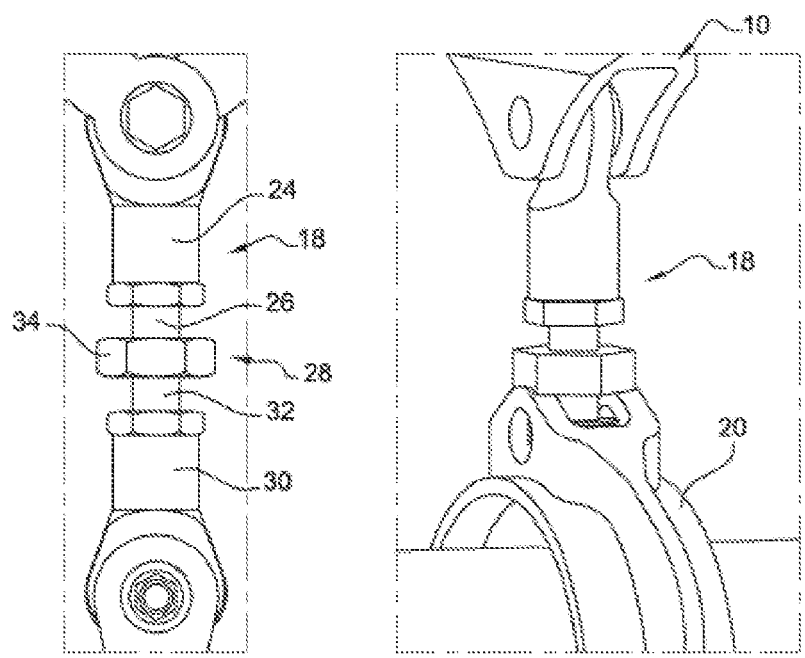

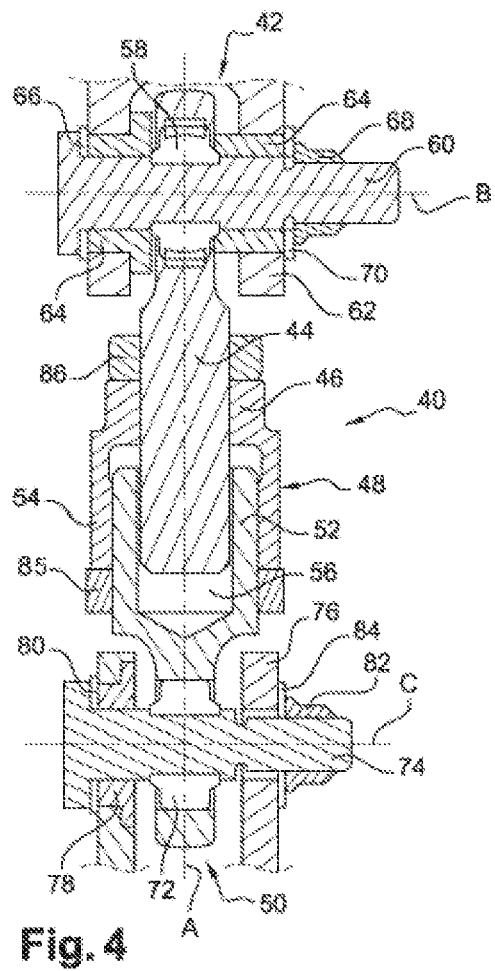
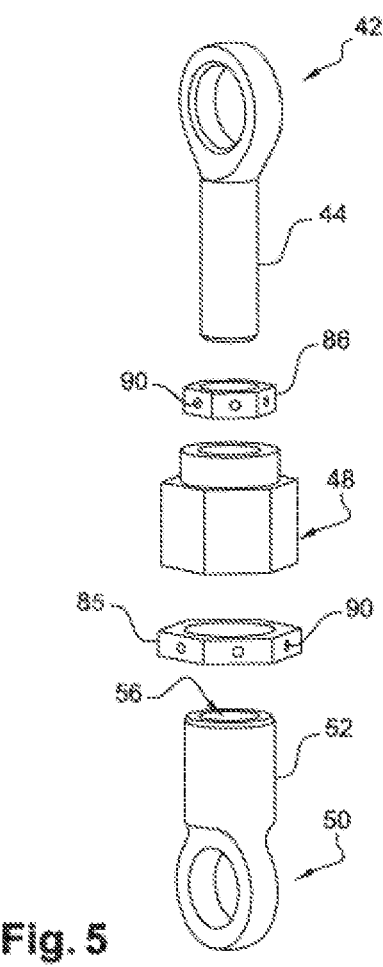
Fig. 4
Fig. 5

ADJUSTABLE-LENGTH CONNECTING ROD FOR TURBOMACHINE

TECHNICAL FIELD

The present invention concerns an adjustable-length connecting rod for a turbomachine for an aircraft such as a helicopter.

PRIOR ART

The prior art comprises especially documents U.S. Pat. No. 5,431,540 and EP-A1-2 499 383.

A helicopter turbomachine is conventionally mounted in a cell and attached to structural elements of the helicopter by connecting rods or similar. As is schematically represented in FIG. 1 for example, the turbomachine 10 is attached to its front or upstream end at first opposite longitudinal ends of connecting rods 12, 14, whose second opposite longitudinal ends are attached to a structural element 16 of the helicopter. A tripod or set of three connecting rods 12 connects a first side of the front end of the turbomachine 10 to the structural element 16, and a bipod or set of two connecting rods 14 connects a second opposite side of the front end of the turbomachine to the structural element 16.

The rear or downstream end of the turbomachine 10 is connected to the structural element 16 by a substantially vertical connecting rod 18, adjustable in length. This connecting rod extends substantially at 6 o'clock, by analogy with the dial of a clock. Its upper longitudinal end is attached to an element of the turbomachine 10 and its lower longitudinal end is attached to an inverted U-shape arch 20, whose free ends are attached onto the structural element 16 of the helicopter. This U-shaped arch 20 defines a space for the passage of a drive shaft 22 of the helicopter tail rotor. Adjusting the length of the rear connecting rod 18 makes it possible especially to make the turbomachine 10 tilt to a greater or lesser extent vis-à-vis the front connecting rods 12, 14.

In the prior art shown in FIG. 2, a first longitudinal end 24 of the connecting rod 18 comprises an internally threaded orifice for screwing an end portion 26 of a threaded shaft 28, and a second longitudinal end 30 of the connecting rod 18 comprises an internally threaded orifice for screwing an opposite end portion 32 of the threaded shaft 28. The shaft 28 comprises a hexagon 34 between the end portions 28, 32, which is configured to cooperate with a tool, such as a key, in order to rotate and screw or unscrew the shaft 28 vis-à-vis the ends 24, 30 of the connecting rod 18. Rotating the shaft 28 makes it possible to translate the ends 24, 30 of the connecting rod, in order to move them closer together or to move them further apart from each other, and thus to adjust the length of the connecting rod to a desired value.

However, in practice, this technology is not entirely satisfactory as, although it makes it possible to extend a connecting rod to a maximum desired value, it does not make it possible to shorten this same connecting rod to a minimum desired value, for example necessary for its integration in the space (here vertical) extending between the turbomachine 10 and the arch 20 (FIG. 3). The adjustment range can moreover be relatively narrow vis-à-vis of the length of the connecting rod. In a specific embodiment, the connecting rod has a length of 126 mm, adjustable between −12 mm and +12 mm (+/−10%).

The present invention proposes a solution to this problem which is simple, effective and economical.

DESCRIPTION OF THE INVENTION

The invention, to this end, proposes an adjustable-length connecting rod for an aircraft turbomachine, this connecting rod having a general elongate shape and comprising two opposite longitudinal ends for attachment to the elements to be connected, characterised in that:
- a first of these longitudinal ends is connected to a first threaded shaft, screwed into a first tubular portion of an adjustment sleeve,
- a second of these longitudinal ends is connected to a second threaded shaft, screwed into a second tubular portion of the adjustment sleeve, and further comprising a housing wherein at least one part of the first shaft is configured to slide.

In the present application, the terms "slide" or "sliding" must be understood as the movement of one element into another element (here, in this case, the first shaft into the housing of the second shaft), without necessarily any contact between these elements.

Advantageously, the first shaft can slide into the second shaft. This makes it possible to increase the adjustment range of the connecting rod and/or to reduce the length thereof to a relatively low value. In a specific embodiment of the invention, the connecting rod has a length of 79 mm, adjustable between −12 mm and +12 mm (+/−15%). The connecting rod according to the invention furthermore allows a significant weight increase with respect to the prior art (around 35% in the specific abovementioned case).

The connecting rod according to the invention can comprise one or more of the following features, taken individually or in combination with each other:
- the first and second shafts, the sleeve and the housing are coaxial,
- a first locknut is screwed onto the first shaft and is able to bear on a free end of said first portion, and a second locknut is screwed onto the second shaft and is capable of bearing on a free end of said second portion; these locknuts are tightened onto the sleeve to immobilise the connecting rod at a determined length,
- said longitudinal ends each comprise a housing wherein is mounted a ball joint passed through by an attachment shaft,
- the first shaft is cylindrical and the second shaft is tubular,
- the threads of the first and second shafts are in opposite directions,
- the threads of the first and second shafts are in same directions, but of different pitches,
- the connecting rod is configured so that the first and second shafts are movable one vis-à-vis the other, by rotating the sleeve, from a first position wherein the shafts are at a distance from one another, to a second position wherein the first shaft is engaged in the second shaft.

The present invention also concerns a turbomachine for an aircraft, such as a helicopter, equipped with at least one connecting rod such as described above.

The present invention also concerns an aircraft, as a helicopter, comprising a cell wherein is mounted a turbomachine such as described above, said connecting rod extending substantially vertically at 6 o'clock by analogy with the dial of a clock, its upper longitudinal end thereof being attached to an element of the turbomachine and the lower longitudinal end thereof being attached to an inverted U-shaped arch, the free ends of which are attached onto a structural element of the helicopter which is passed through by a tail rotor shaft of the latter.

DESCRIPTION OF THE FIGURES

The invention will be better understood and other details, features and advantages of the invention will appear more clearly upon reading the following description, made as a non-limiting example and in reference to the appended drawings, wherein:

FIG. 1 is a schematic, partial, perspective half-view of an aircraft, of the helicopter type, equipped with a turbomachine, FIGS. 2 and 3 are schematic, perspective views of an adjustable connecting rod of the prior art, FIG. 4 is a schematic view in axial section of a connecting rod according to the invention, FIG. 5 is a schematic, cross-sectional, perspective, exploded view of a connecting rod according to the invention.

DETAILED DESCRIPTION

Figures 6, 7:
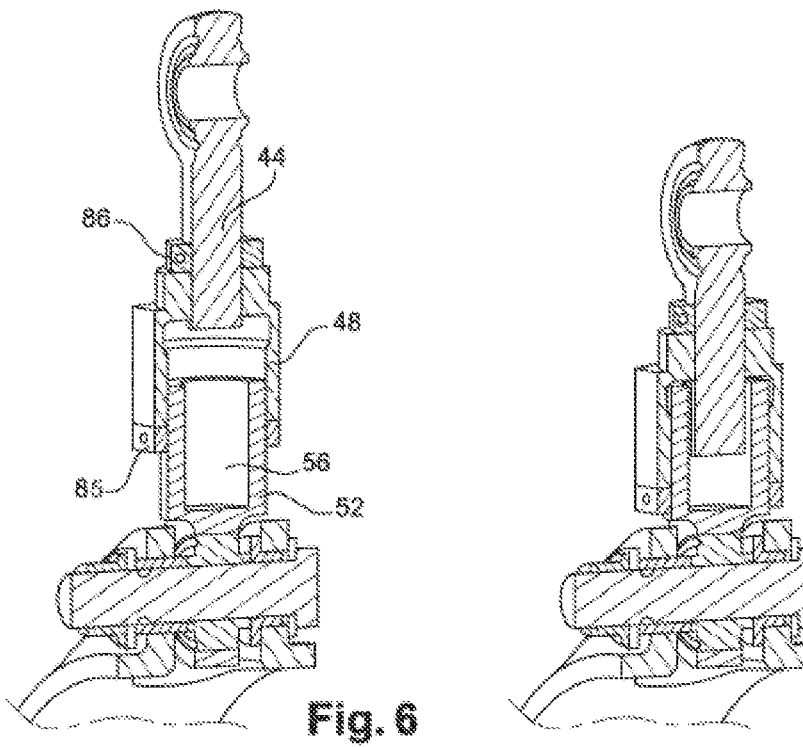
FIGS. 6 and 7 are schematic, perspective views in axial section of the connecting rod of FIG. 4, and respectively show two extreme positions of adjustment of the connecting rod.

FIGS. 1 to 3 have been described above, and illustrate the prior art to the present invention.

FIG. 4 and following illustrate an embodiment of the connecting rod 40 according to the invention, wherein:

a first longitudinal end 42 of the connecting rod 40 is connected to a first threaded shaft 44, screwed into a first tubular portion 46 of an adjustment sleeve 48, and a second opposite longitudinal end 50 of the connecting rod is connected to a second threaded shaft 52, screwed into a second tubular portion 54 of the sleeve 48, this shaft 52 comprising a housing 56 wherein at least part of the first shaft 44 is configured to slide during the adjustment of the connecting rod.

The threaded shaft 44 is secured to the first end 42 and is preferably formed in one piece with the latter. The first shaft 44 has an elongate shape of axis A. The thread thereof extends over a major part of the length thereof, to the free end thereof opposite the end 42. This end 42 comprises a housing, wherein is mounted a ball joint 58 passed through by a screw 60. The end 42 is engaged between the two lugs of a clevis 62 which comprises aligned orifices for mounting the screw 60. Sleeves 64 are mounted in the orifices of the clevis 62 and around the screw. The screw 60 comprises a head which bears on one of the sleeves by way of a washer 66, and receives at the opposite end thereof a nut 68 which bears on the other sleeve by way of a washer 70. The ball joint 58, associated with the fact that the thickness or axial size of the end 42 along the axis B of the screw 60 is less than the distance between the lugs of the clevis 62 along the same axis B, enables tilts of the shaft 44 vis-à-vis a plane perpendicular to the axis B.

In the same manner, the threaded shaft 50 is secured to the second end 52 and is preferably formed in one piece with the latter. This shaft 50 has an elongate shape along the axis A and is therefore coaxial with the shaft 44. The thread thereof extends over a major part of its length, to its free end opposite the end 52. This end 52 comprises a housing wherein is mounted a ball joint 72 passed through by a screw 74. The end 52 is engaged between the two lugs of a clevis 76 which comprises aligned orifices for mounting the screw 74. At least one sleeve 78 is mounted in the orifices of the clevis 76 and around the screw. The screw 74 comprises a head which bears on the sleeve by way of a washer 80, and receives at its opposite end a nut 82 which bears on another sleeve or the corresponding lug of the clevis 76 by way of a washer 84. The ball joint 72, associated with the fact that the thickness or axial size of the end 52 along the axis C of the screw 74 is less than the distance between the lugs of the clevis 76 along the same axis C, enables tilts of the shaft 52 vis-à-vis a plane perpendicular to the axis C.

The shaft 44 and in particular its thread has an outside diameter D1. The shaft 52 and in particular the housing 56 thereof has an inside diameter D2, which is greater than D1 so that the shaft 44 can cooperate by sliding in the housing 56. The housing 56 of the shaft 52 has a generally cylindrical shape in the example shown. Because of this housing, the shaft 52 has a generally tubular shape.

The tubular portion 54 of the sleeve 48 surrounds the shaft 52 and comprises a free end, situated on the same side as the end 50, which is intended to cooperate by bearing with a locknut 85 screwed onto the shaft 52. It is here the same thread of the shaft 52 which cooperates with the sleeve 48 and the locknut 85. The opposite end of this tubular portion 54 is connected to the tubular portion 46 of the sleeve, which surrounds the shaft 44. This tubular portion 46 comprises a free end, situated on the same side as the end 42, which is intended to cooperate by bearing with another locknut 86 screwed onto the shaft 44. Here, this is the same thread of the shaft 44 which cooperates with the sleeve 48 and the locknut 86.

In the example shown, the housing 56 has a length along the axis A which is configured to receive at least part, and for example up to 50%, of the length of the shaft 44. The tubular portion 54 of the sleeve 48 has a length along the axis A which is similar to that of the housing 56 or of the thread of the shaft 52.

The threads of the first and second shafts 44, 52 can be in opposite directions. In a variant, they are in the same directions, but of different pitches. For a given rotation of the sleeve 48, the movement of the shafts 44, 52 will be greater with threads of opposite directions than with threads of same directions and of different pitches. The advantage of the first case resides in the fact that a rotation of the sleeve through a small angle can make it possible to move the shafts 44, 52 over a significant distance, and the advantage of the second case resides in the fact that the adjustment of the relative positions of the shafts can be more precise.

FIGS. 6 and 7 show the connecting rod 40 respectively in a maximum elongated position and a maximum return position. In other words, the connecting rod has a maximum length in FIG. 6 and a minimum length in FIG. 7.

In FIG. 6, the tubular portion 54 of the sleeve 48 is screwed on a first entry part of the thread of the shaft 52 and, in the same manner, the tubular portion 46 of the sleeve 48 is screwed on a first entry part of the thread of the shaft 44. The sleeve is thus positioned so as to move the shafts 44, 52 as far away as possible from each other, the shaft 44 not being engaged in the housing 56 of the shaft 52.

In FIG. 7, the tubular portion 54 of the sleeve 48 is screwed as far as an end part of the thread of the shaft 52 and, in the same manner, the tubular portion 46 of the sleeve 48 is screwed onto an end part of the thread of the shaft 44. The sleeve is then positioned so as to move the shafts 44, 52 as close as possible to each other, the shaft 44 being engaged in the housing 56 of the shaft 52.

In the two cases shown, the locknuts 85, 86 are screwed and abut on the respective free ends of the sleeve 48 to lock it with respect to rotation vis-à-vis the shafts 44, 52. In the case of FIG. 7, the locknuts 85, 86 are in the immediate vicinity of the ends 42, 50 of the connecting rod.

Figure 8:
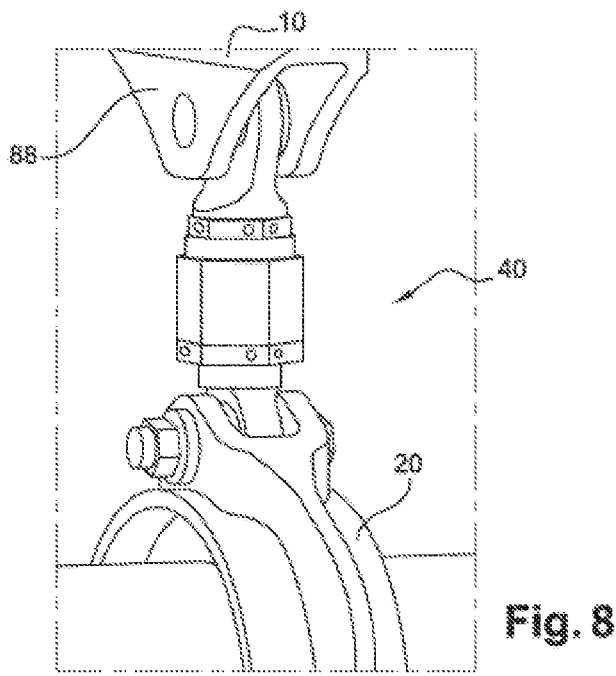
FIG. 8 is a schematic, perspective view of the connecting rod of FIG. 4 in an assembly environment.

FIG. 8 shows the connecting rod 40 in the environment corresponding to FIG. 1. It connects a member, such as a clevis 88, of a turbomachine 10 to the arch 20. Hence it is understood that the clevis 88 forms the clevis 62 of FIG. 4, and the clevis of the support 20 forms the clevis 76 of FIG. 4.

It can also be noted in FIGS. 5 to 8 that the locknuts 84, 85 comprise orifices 90 passed through by of at least one lock wire to immobilise them with respect to rotation. The same lock wire can for example pass through the orifices 90 of two locknuts 84, 85.

As stated above, it is the rotation of the sleeve 48 which makes it possible to adjust the length of the connecting rod 40. The rotation of the sleeve can be achieved by means of a tool such as a key. In the example shown, the portion 54 of the sleeve 48 has, in cross section, a non-circular and for example hexagonal peripheral shape in view to cooperate with such a key.

The invention claimed is:

1. An adjustable-length connecting rod for an aircraft turbomachine, the connecting rod comprising:
   a generally elongate shape;
   a first longitudinal end and a second longitudinal end opposite the first longitudinal end, the longitudinal ends configured for attachment to elements, wherein the first longitudinal end is connected to a first threaded shaft screwed into a first tubular portion of an adjustment sleeve, and the second longitudinal end is connected to a second threaded shaft screwed into a second tubular portion of the adjustment sleeve; and
   a housing in which at least part of the first shaft is configured to slide.

2. The connecting rod of claim 1, wherein the first and second shafts, the sleeve, and the housing are coaxial.

3. The connecting rod of claim 1, wherein a first locknut is screwed onto the first shaft and the first locknut is able to bear on a free end of the first portion, and a second locknut is screwed onto the second shaft and the second locknut is capable of bearing on a free end of the second portion.

4. The connecting rod of claim 1, wherein the first and second longitudinal ends each comprise a housing in which is mounted a ball joint passed through by an attachment screw.

5. The connecting rod of claim 1, wherein the first shaft is cylindrical and the second shaft is tubular.

6. The connecting rod of claim 1, wherein the threads of the first and second shafts are in opposite directions.

7. The connecting rod of claim 1, wherein the threads of the first and second shafts are in the same directions, but have different pitches.

8. The connecting rod of claim 1, wherein the first and second shafts are movable one vis-à-vis the other, by rotating the sleeve, from a first position, wherein the shafts are at a distance from each other, to a second position, wherein the first shaft is engaged in the second shaft.

9. A turbomachine for an aircraft equipped with at least one connecting rod according to claim 1.

10. An aircraft, comprising a cell in which is mounted a turbomachine according to claim 9, the connecting rod extending substantially vertically, the first longitudinal end thereof being attached to an element of the turbomachine, and the second longitudinal end thereof being attached to a structural element of the aircraft.

11. The turbomachine of claim 9, wherein the aircraft is a helicopter.

12. The turbomachine of claim 10, wherein the aircraft is a helicopter.

* * * * *